United States Patent
Huang

(10) Patent No.: US 8,110,951 B2
(45) Date of Patent: Feb. 7, 2012

(54) ELECTROMAGNETIC VIBRATOR AND PRODUCING METHOD THEREOF

(76) Inventor: Hsin Min Huang, Ningbo (CN)

( * ) Notice: Subject to any disclaimer, the term of this patent is extended or adjusted under 35 U.S.C. 154(b) by 544 days.

(21) Appl. No.: 12/319,495

(22) Filed: Jan. 7, 2009

(65) Prior Publication Data

US 2010/0171376 A1 Jul. 8, 2010

Related U.S. Application Data

(63) Continuation-in-part of application No. 12/308,675, filed on Dec. 17, 2008.

(51) Int. Cl.
*H02K 33/00* (2006.01)
*H02K 35/00* (2006.01)
(52) U.S. Cl. .............. 310/25; 310/28; 310/15; 381/326; 381/423
(58) Field of Classification Search .................... 310/25, 310/28, 15; 381/326, 423
See application file for complete search history.

(56) References Cited

U.S. PATENT DOCUMENTS

| | | | | |
|---|---|---|---|---|
| 4,584,439 A | * | 4/1986 | Paddock | 381/89 |
| 5,408,533 A | * | 4/1995 | Reiffin | 381/96 |
| 5,430,805 A | * | 7/1995 | Stevenson et al. | 381/408 |
| 5,703,337 A | * | 12/1997 | Geisenberger | 181/206 |
| 6,278,787 B1 | * | 8/2001 | Azima | 381/152 |
| 6,925,191 B2 | * | 8/2005 | Petroff et al. | 381/423 |
| 7,088,838 B2 | * | 8/2006 | Rye et al. | 381/336 |
| 2004/0022409 A1 | * | 2/2004 | Hutt et al. | 381/423 |
| 2004/0165746 A1 | * | 8/2004 | Kreitmeier et al. | 381/398 |
| 2004/0202343 A1 | * | 10/2004 | Rye et al. | 381/353 |
| 2005/0078850 A1 | * | 4/2005 | Norton | 381/423 |
| 2005/0111689 A1 | * | 5/2005 | True | 381/423 |
| 2005/0135651 A1 | * | 6/2005 | Hakansson | 381/396 |
| 2005/0185809 A1 | * | 8/2005 | Bianchini | 381/190 |
| 2005/0185816 A1 | * | 8/2005 | Roark et al. | 381/400 |
| 2005/0207612 A1 | * | 9/2005 | D'Hoogh | 381/423 |
| 2006/0062421 A1 | * | 3/2006 | Kuribayashi et al. | 381/424 |
| 2007/0071274 A1 | * | 3/2007 | Andersen et al. | 381/404 |
| 2007/0081693 A1 | * | 4/2007 | Andersen et al. | 381/423 |
| 2010/0092023 A1 | * | 4/2010 | Bryant et al. | 381/397 |

FOREIGN PATENT DOCUMENTS

| | | | | |
|---|---|---|---|---|
| CN | 2328129 Y | * | 7/1999 | |
| CN | 2372796 Y | * | 4/2000 | |
| CN | 1794883 A | * | 6/2006 | |

* cited by examiner

*Primary Examiner* — Quyen Leung
*Assistant Examiner* — Alex W Mok
(74) *Attorney, Agent, or Firm* — Raymond Y. Chan; David and Raymond Patent Firm

(57) ABSTRACT

An electromagnetic vibrator includes a vibration sheet, suspension edge, basin frame and magnetic return path system. The electromagnetic vibrator is prepared as connecting back surface of vibration sheet to voice coil being set in magnetic return path system, injecting the vibration sheet and suspension edge to be an integral unit, connecting suspension edge with basin frame by ultrasonic mode and connecting vice coil wire to terminal sheet on basin frame after the wire is connected by vibration sheet.

32 Claims, 12 Drawing Sheets

ELECTROMAGNETIC VIBRATOR AND PRODUCING METHOD THEREOF

CROSS REFERENCE TO RELATED APPLICATION

This is a Continuation-In-Part of a non-provisional application having an application Ser. No. 12/308,675 and a filing date of Dec. 17, 2008.

BACKGROUND OF THE PRESENT INVENTION

1. Field of Invention

The present invention relates to a device using electromagnetic effect to generate vibration, and more particularly to an electromagnetic vibrator and a producing method, which can be applied on the electromagnetic vibrator of the current using speakers or a fan such as a radiator of a laptop.

2. Description of Related Arts

An electromagnetic vibrator, taught by China patent CN2328129, published on Jul. 7, 1999, comprises a core, an armature, a coil, a resonance spring, a holder or a link fork, and a vibration body or a feeding groove. The electromagnetic vibration is generated by supplying current through the coil. But this type of vibrator has a large size, the vibration frequency is low, the frequency range is small, the efficiency is low and can not sufficiently transform the electrical energy into mechanical energy. The usage of this type of vibrator is limited, especially when high frequency is required.

The existing speaker comprises a vibration sheet, a suspension edge, a basin frame, and a magnetic loop system. The vibration sheet is attached with the suspension edge via glue. The suspension edge is also attached with the frame via glue. The amount of the glue will affect the mass of the vibration sheet which is a critic factor of the speaker's quality. In the point of chemistry, generally the glue is using van der Waals force or Hydrogen bond instead of chemical bond, so the reliability is always a problem. During time, the elements will be peeled off due to oxidization of the glue. Such a product needs several processes of gluing, performed manually. The process is complex, difficult to maintain the consistency and stability, so as to the quality of the product. The application of the product is limited.

A conventional manufacturing process of the above electromagnetic vibrator of the speaker comprises the following steps.

1. Magnetic loop system: glue a T iron, magnetic steel, and an upper plate together.
2. Glue the vibration sheet and the suspension edge together to form a vibration member.
3. Combine the magnetic circuit and a basin frame.
4. Glue the magnetic loop system, vibration member, and the basin frame together.
5. Welding the voice coil wire and a terminal sheet of the basin frame together.

From the above steps, variable glues are used in the conventional manufacturing steps of the speaker. The glue makes the relatively more errors during the manufacturing process, wherein the errors are also one of the main factors that decrease the quality of the speaker. The complicated manufacturing process is also involved in the glue process of the speaker and decreased the production efficiency.

SUMMARY OF THE PRESENT INVENTION

The main object of the present invention is to provide an electromagnetic vibrator to overcome the disadvantage of current using technology. Based on the vibration principle and construct of speakers, the present invention improves the structure and production process, to achieve a stable natural frequency and a high efficiency, as well as a simplified structure and high stability.

The present invention also provides a process of manufacture of an electromagnetic vibrator, which is easy to perform, the product passing rate and consistency is high.

Accordingly, in order to accomplish the above objects, the present invention provides an electromagnetic vibrator, comprising a vibration sheet, a suspension edge, a basin frame, and a magnetic loop system, wherein the back of the vibration sheet is connected with the voice coil. The voice coil is positioned within the magnetic loop system. The vibration sheet is integrated with the suspension edge. The voice coil wire is connected with the vibration sheet, and further connected with the terminal sheet on the basin frame.

The vibration sheet can be formed by injection molding. Conductive sheet can also be embedded inside the vibration sheet. Voice coil wire is connected with the conductive sheet, and then connected with the terminal sheet on the basin frame through a conductive wire in order to increase the weight of the vibration sheet, to make the connection easy, and to provide the required frequency.

The conductive sheet can be formed in a round shape, for adding weight. Otherwise the conductive sheet can be formed in two pieces to form a single round shape, and performed as two poles respectively.

The magnetic loop system is similar to the structure of speakers. When a sine wave is inputted, the vibrator will vibrate. When a sine wave with a fixed frequency is inputted, and such frequency equals to the resonance frequency of the vibratory, the amplitude could be very large even with limited input energy.

The present invention also provides a method to fabricate the electromagnetic vibrator, comprising the following steps.

(1) Injection mold a vibration sheet.
(2) Integrate the vibration sheet with the suspension edge by injection.
(3) Connect the suspension edge with the basin frame by ultrasonic mode.
(4) Connect the back side of the vibration sheet with the voice coil by glue, and connect the voice coil wire with the conductive wire through the vibration sheet, wherein the other end of the conductive wire is connected with the terminal sheet of the basin frame.
(5) Affix the magnetic loop system in the basin frame.

To ensure the right frequency of the vibrator, the most important step is to control the weight of the vibration sheet. The step of injection molding the vibration sheet, and integrating the vibration sheet with the suspension edge by injection can enable the consistency of the weight to ensure the quality of the vibration sheet.

In step (2), since the vibration sheet needs to be small in size but still has a particular amount of weight, a conductive sheet is embedded therein which is coated with a layer of plastic material for insulation. Then using a special mold, at the time of injecting the suspension edge by the injector, the suspension edge and the vibration sheet are formed integrally.

The conductive sheet can be two separated pieces aligned together to form a single round shape, or an integral round shape. The material of the conductive sheet could be copper, tinned aluminum, or PCB plate, for the purposes of conducting and adding weight.

Comparing to current technique, the present invention has the following the advantages.

The electromagnetic vibrator is improved from the construct and principle of speakers, the construct is simple, the size is flexible. It is easy to obtain stable natural frequency, and high efficiency, and suitable for mass production.

Because the process is using the injection molding machine instead of glue, it can guaranty the consistency and stability of the mass of the vibration sheet. The connection of the basin frame is using ultrasonic mode instead of glue. The amount of glue applied directly affects the resonance frequency of the vibrator. There is always error in the process of applying glue no matter apply manually or by machine. Also, glue will be oxidized after time to cause peeling off. Therefore, the present invention overcomes the disadvantage of conventional technique by using glue. The quality and passing rate are increased, the cost is reduced.

The present invention uses the embedded conductive sheet to adjust the weight of the vibration sheet, and consequently to adjust the resonance frequency. Therefore, the frequency is very easy to be the same as the frequency of the AC power supply so as to resonate. With a very small amount of energy, such as a very low voltage supplied, the vibrator will vibrate severely with the maximum amplitude, to generate the maximum vibration energy.

There are many advantages such as adjustable dimension, high efficiency, high performance reliability, high consistency, and low cost of the present invention, it can be widely used in many fields including speakers.

These and other objectives, features, and advantages of the present invention will become apparent from the following detailed description, the accompanying drawings, and the appended claims.

DETAILED DESCRIPTION OF THE PREFERRED EMBODIMENT

Figure 1:
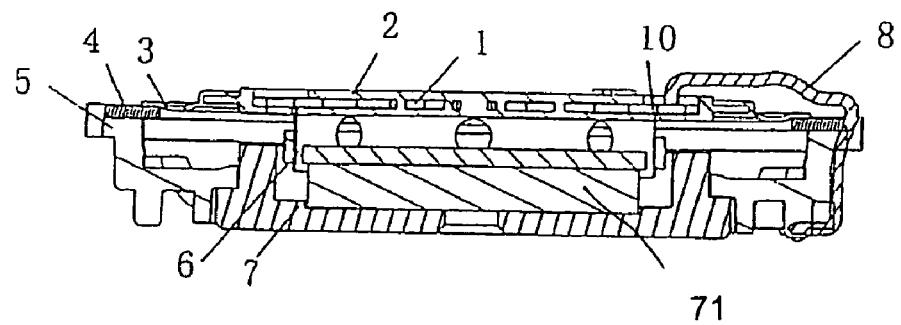
FIG. 1 is a sectional schematic view of an electromagnetic vibrator according to a preferred embodiment of the present invention.
Figure 3:
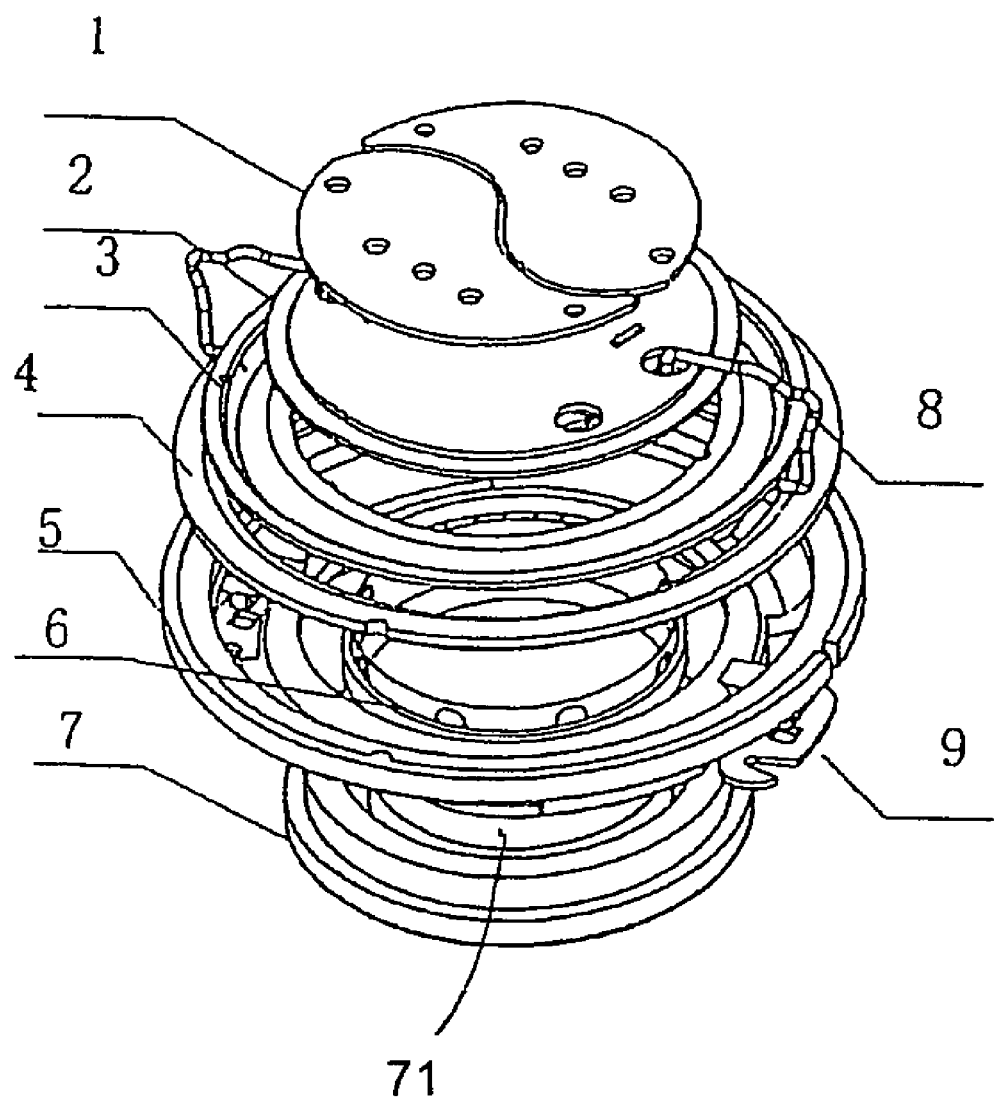
FIG. 3 is an exploded perspective view of the electromagnetic vibrator according to the above preferred embodiment of the present invention.
Figure 4:
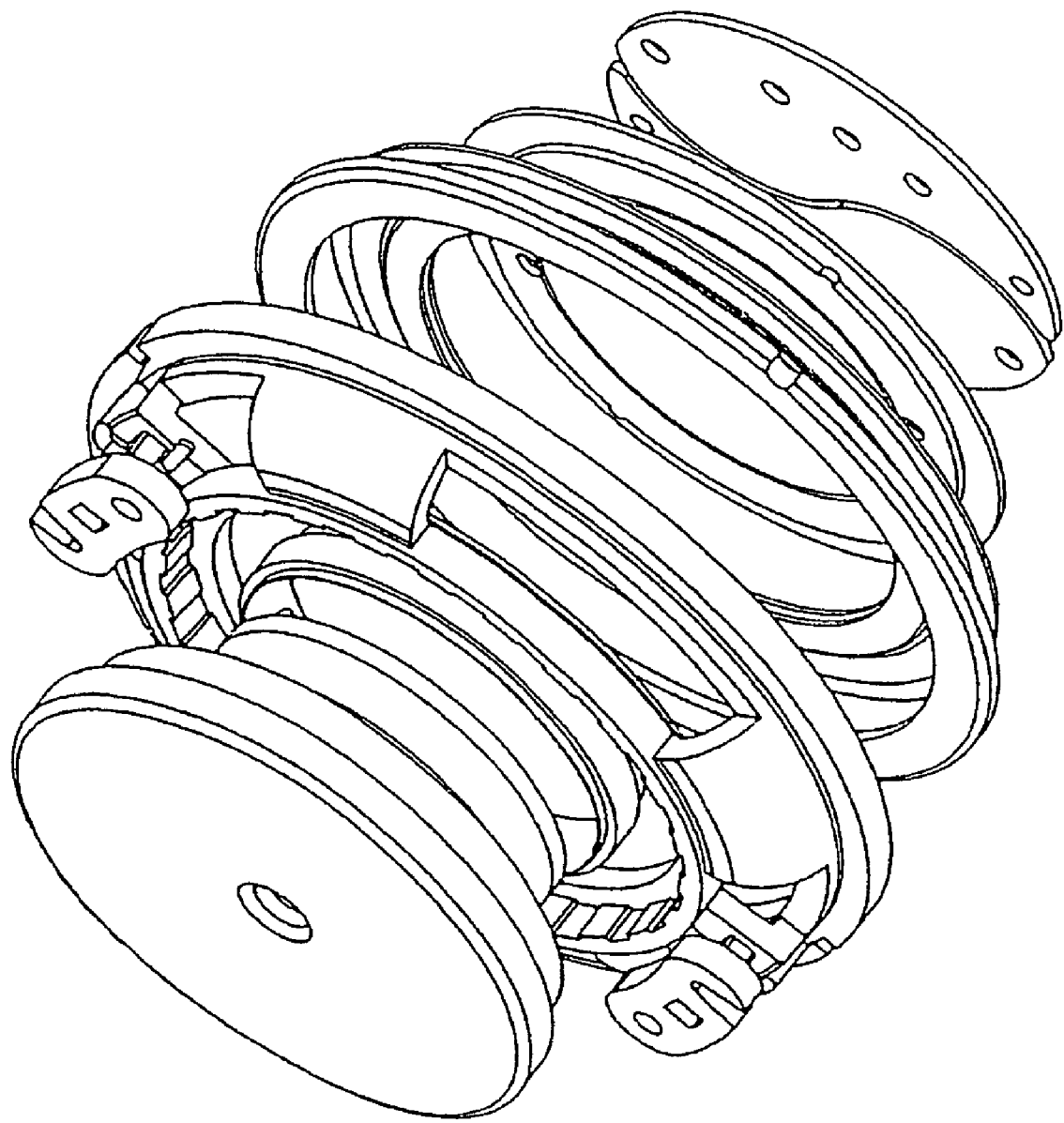
FIG. 4 is another exploded perspective view of the electromagnetic vibrator according to the above preferred embodiment of the present invention.

Referring to FIGS. 1, 3 and 4, an electromagnetic vibrator according to a preferred embodiment of the present invention is illustrated, wherein the electromagnetic vibrator comprises a vibration sheet 2, a suspension edge 3, a basin frame 5, and a magnetic loop system 7. The vibration sheet 2 comprises two conductive sheets 1 sealed therewithin, wherein the two conductive sheets 1 are spaced apart from each other and are aligned to form a round shape. The vibration sheet 2 is connected with the suspension edge 3 first, and then connected with a gasket 4, and then connected with the whole basin frame 5. The lower edge of the suspension edge 3 is connected with a voice coil 6. The other end of the voice coil 6 is suspended over the permanent magnet 71 of the magnetic loop system 7, wherein the permanent magnet 71 of the magnetic loop system 7 is formed as a one piece magnetic vibration provider for providing a magnetic field. The magnetic loop system 7 is affixed within the basin frame 5.

The conductive sheets 1 are connected with the connection racks located on two sides of the basin frame 5 though conductive wires 8 respectively. The conductive sheets 1 are also connected with the voice coil 6 through voice coil wire 10.

The electromagnetic vibrator is fabricated with the method comprising the following steps.

(1) Injection molding a vibration sheet 2.

(2) Embed the conductive sheets 1 into the vibration sheet 2 by injection.

(3) Integrate the vibration sheet 2 with the suspension edge 3 by injection.

(4) Connect the suspension edge 3 of the vibration sheet 2 with the basin frame 5 by ultrasonic connection.

(5) Connect the back of the vibration sheet 2 with the voice coil 6 by glue, and connect the voice coil wire 10 with the conductive wire 8 through the vibration sheet 2, wherein the other end of the conductive wire 8 is connected with the terminal sheet 9 of the basin frame 5 to integrally form a one piece vibration body for generating vibration of the vibration sheet 2 in responsive to the magnetic field.

(6) Affix the magnetic loop system 7 in the basin frame 5.

Figure 2:
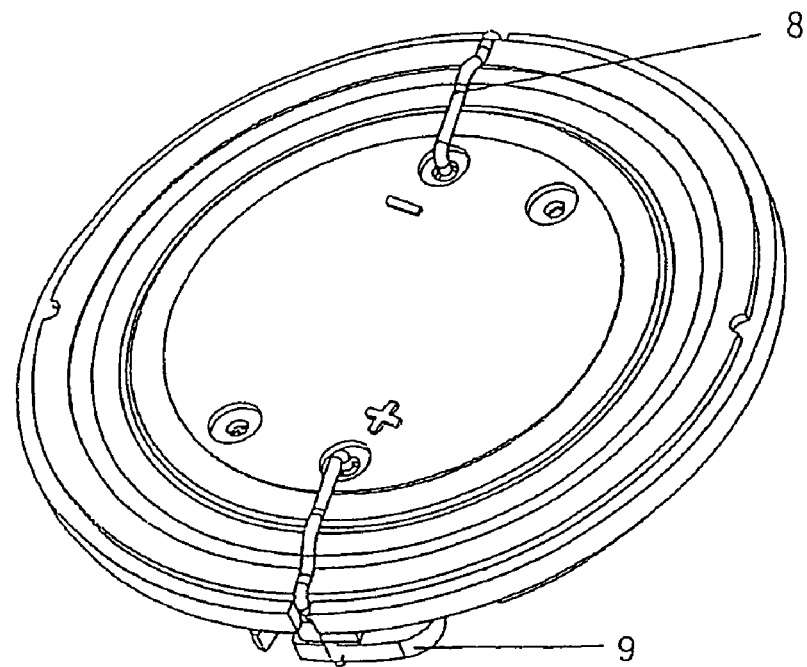
FIG. 2 is a perspective view of the electromagnetic vibrator according to the above preferred embodiment of the present invention.

FIG. 2 illustrates the embodiment of electromagnetic vibrator fabricated by the above method.

In step (4), the suspension edge 3 of the vibration sheet 2 can also be integrally formed with the gasket 4 together, and then connected with the basin frame 5 by ultrasonic connection to prevent the unwanted shift of the vibration sheet 2, and to connect accurately.

The vibration sheet 2 can be formed by injecting molding directly, or by embedding the conductive sheets 1 into the vibration sheet 2 via injection. The conductive sheet 1 could be two pieces spacedly aligned to form a round shape. The material of the conductive sheet 1 could be copper, tinned aluminum, or PCB plate, for the purposes of conducting and adding weight. The conductive sheet 1 is coated with a plastic layer (such as PP) for insulation, and is embedded into the vibration sheet 2. Then using a special mold, at the time of injecting the suspension edge 3 by the injector, the suspension edge 3 and the vibration sheet 2 are formed integrally. In other words, the conductive sheets 1, the vibration sheet 2, the suspension edge 3, the gasket 4, the basin frame 5, the voice coil 6 are integrally formed in one piece vibration body. Therefore, the vibration body is coupled with the magnetic vibration provider to magnetically communicate the voice coil 6 with the permanent magnet 71 of the magnetic loop system 7.

The conductive sheet 1 could be metal sheet, such as copper and tinned aluminum, or PCB material.

The two relative conductive sheets 1 are aligned in "S" shape, (Tai Chi or yin-yang shape), in order to prevent the conductive sheets 1 from being tilted in different levels at the planar direction during resonant vibration. The tilted conductive sheets 1 will affect the quality of the vibrator.

The conductive sheets 1 can increase the weight of the vibration sheet 2, adjust the resonance frequency for resonate with the input AC current. It also acts as the conductive media for the voice coil wire 10 of the voice coil 6 for the current input.

Figure 5:
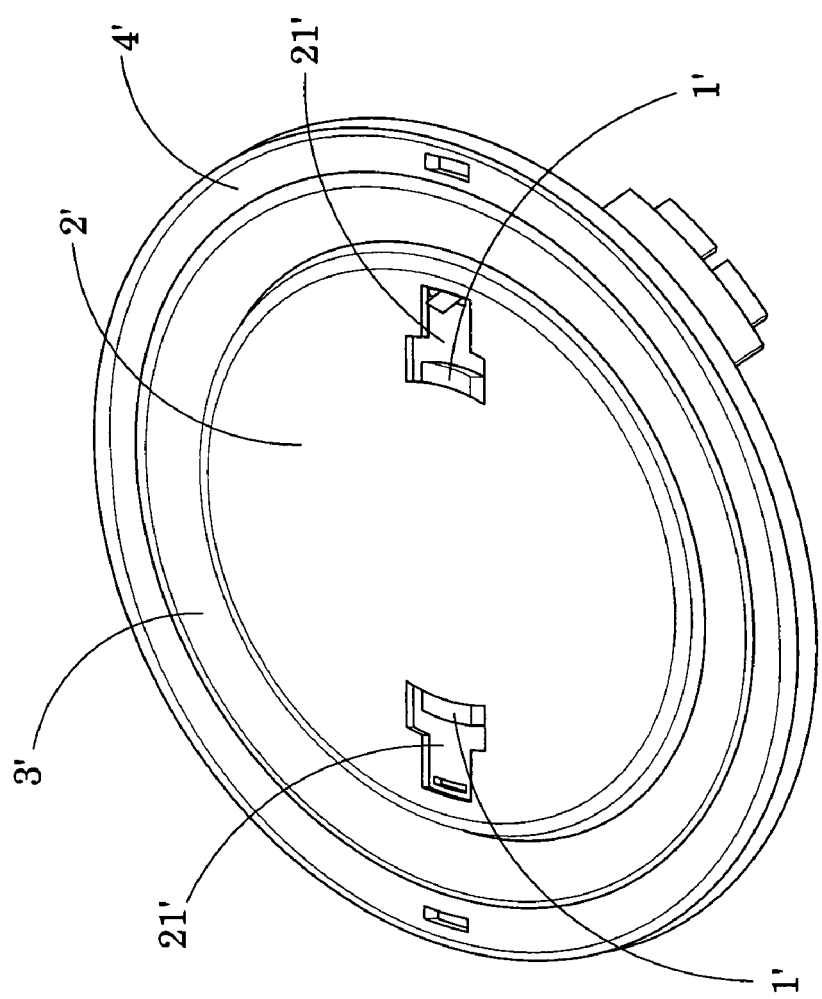
FIG. 5 is a perspective view of the electromagnetic vibrator according to a second embodiment of the present invention.
Figure 6:
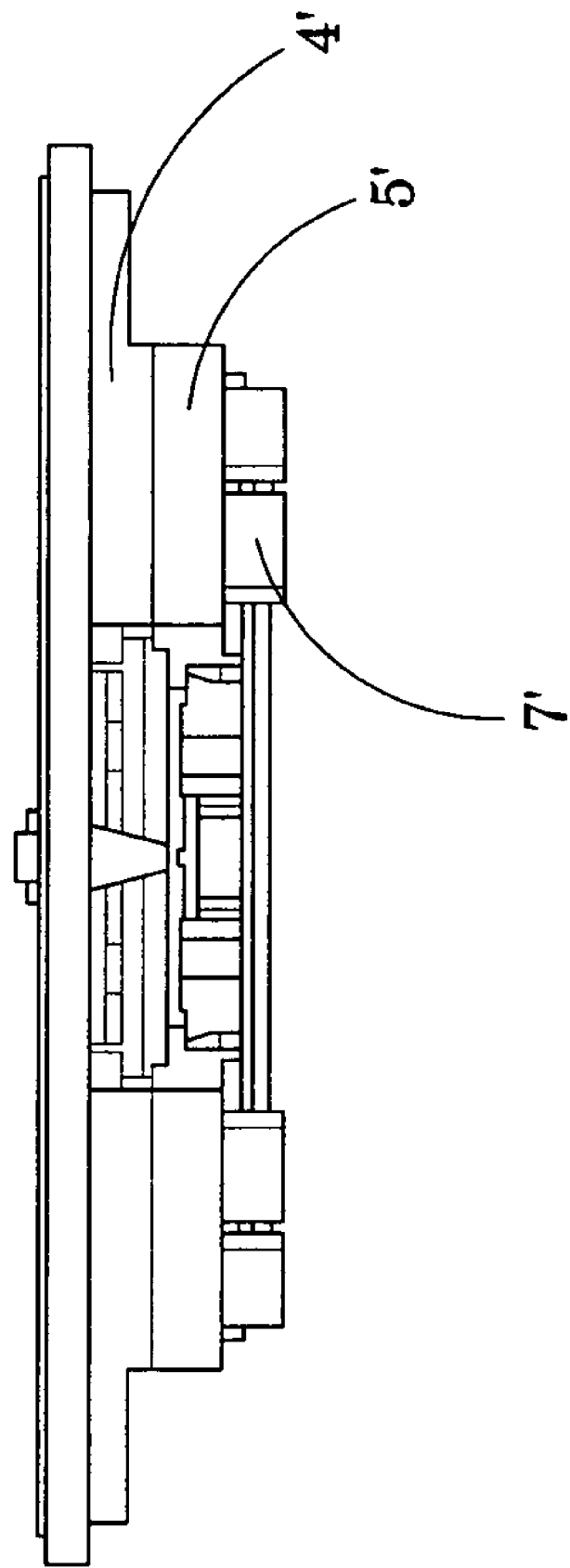
FIG. 6 is a partially sectional view of the electromagnetic vibrator according to the second embodiment of the present invention.
Figure 7:
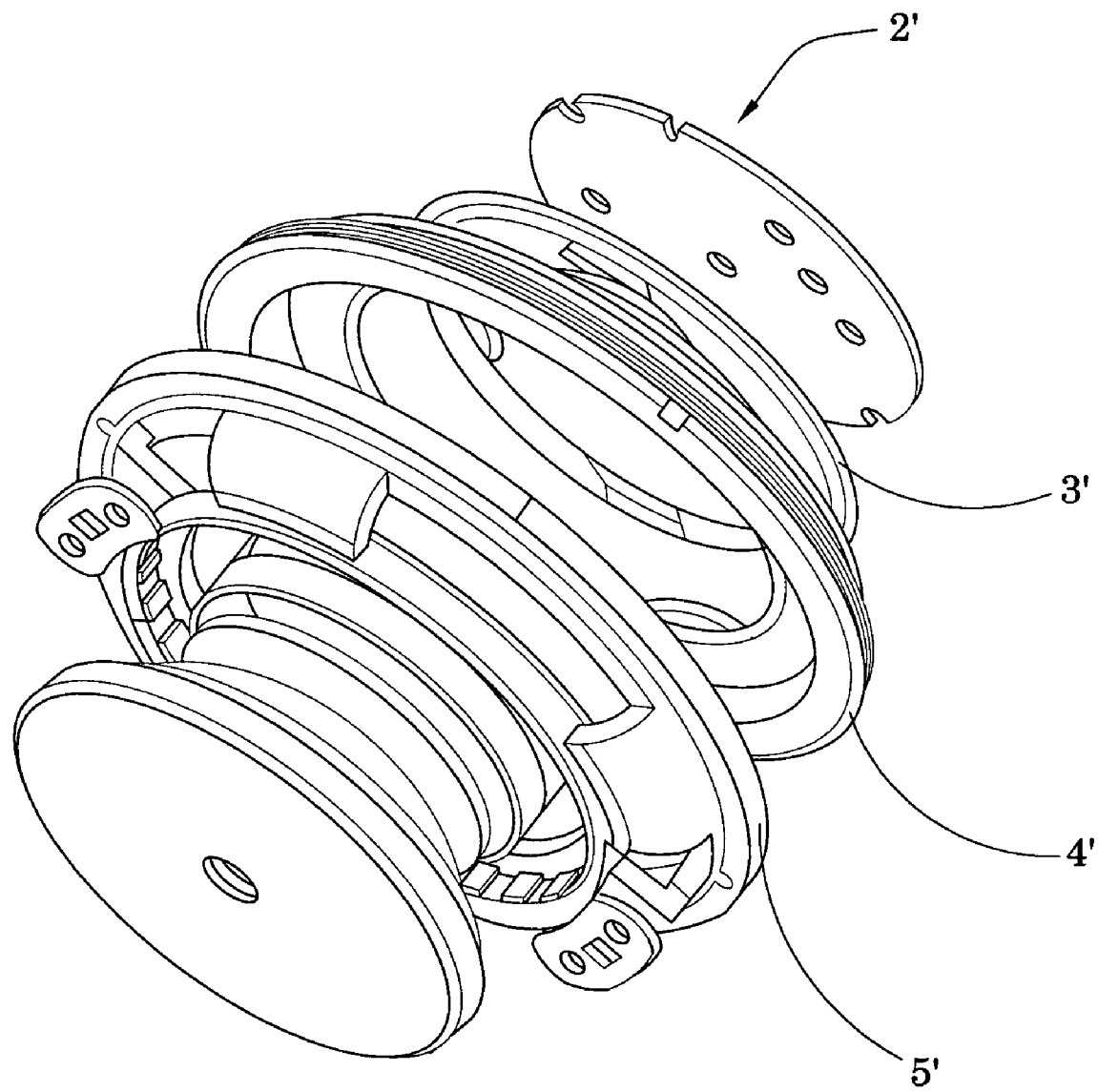
FIG. 7 is an exploded perspective view of the electromagnetic vibrator according to the second preferred embodiment of the present invention.

Referring to FIG. 5, 6, and 7 of the drawings, an electromagnetic vibrator according to a second embodiment of the present invention is illustrated, wherein the electromagnetic vibrator comprises a vibration body and a magnetic vibration provider. The vibration body comprises a vibration sheet 2', a suspension edge 3', and a voice coil unit 6', wherein the vibration sheet 2' comprises two conductive sheets 1' sealed therewithin to form a flat surface of the vibration sheet 2', wherein the two conductive sheets 1' are spaced apart from each other and are aligned to form a round shape, so that the conductive sheets 1' can be used as a cathode and anode.

The suspension edge 3' has a ring shape, wherein the vibration sheet 2' is embedded at the inner edge of the suspension edge 3'. Accordingly, the vibration sheet 2' has a flat surface aligning with the suspension edge 3'. It is appreciated that the flat surface of the vibration sheet 2' embedding the conductive sheet 1' not only can be easily formed by the injection molding, but also can minimize the size of the electromagnetic vibrator of the present invention, i.e. the thickness of the electromagnetic vibrator.

The voice coil unit 6' is affixed at the back of the vibration sheet 2', wherein the voice coil unit 6' comprises a voice coil and a voice coil wire operatively extended from the voice coil. The vibration sheet 2' has two or more through engaging slots 21' spacedly formed at the flat surface of the vibration sheet 2', wherein the voice coil unit 6' has two or more protrusions 61' upwardly protruded at the peripheral of the voice coil unit 6' having a size and a shape geographically matching the size and the shape of the engaging slots 21' of the vibration sheet 2', so that the voice coil unit 6' is coupled at the back side of the vibration sheet 2' by slidably penetrating the protrusions 61' of the voice coil unit 6' into the engaging slots 21' of the vibration sheet 2' respectively. Accordingly, the protrusions 61' are preferably made of bendable material, such as metal, and arranged to be bent on the flat surface of the vibration sheet 2 after the protrusions 61' are inserted through the engaging slots 21' respectively to securely couple the voice coil unit 6' with the vibration sheet 2'. It is worth mentioning that the inserting method for coupling the voice coil unit 6' and the vibration sheet 2' provides a connecting way to connect the voice coil unit 6' and the vibration sheet 2' without a glue, so that it can avoid the inaccurate of the amount of the glue using between the connection of the voice coil unit 6' and the vibration sheet 2' and provide an relatively easier way to align the voice coil unit 6' with the vibration sheet 2'.

The conductive sheet 1' further comprises a conductive wire 8' having one end extended from the voice coil wire to operatively extend from the voice coil unit 6'.

The vibration sheet 2' is integrally connected with the suspension edge 3' by an injection molding, so that the vibration sheet 2', the two conductive sheets 1', the voice coil unit 6', and the suspension edge 3' are integrally formed one piece element.

It is worth to mention that the vibration body further comprises a gasket 4' integrally coupling with the periphery (outer edge) of the suspension edge 3' by mold injection, wherein the gasket 4' is arranged to couple with the magnetic vibration provider. Accordingly, the suspension edge 3' is coupled with the gasket 4' by an injection molding method to integrally affix the edge portion of the suspension edge 3' to the gasket 4'.

Figure 8:
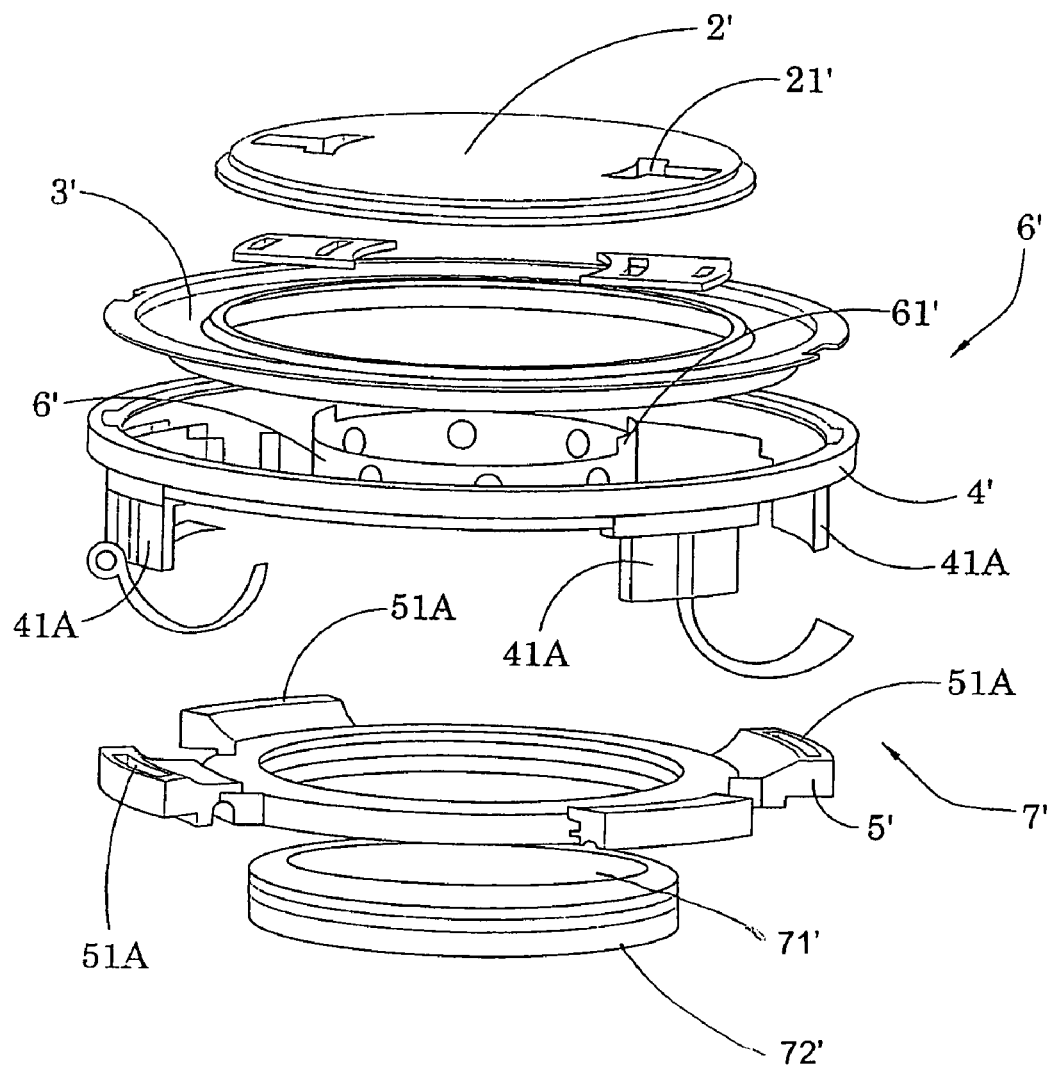
FIG. 8 is an exploded perspective view of the electromagnetic vibrator according to a first alternative of the second embodiment of the present invention.

The magnetic vibration provider comprises a basin frame 5' and a magnetic loop system 7' supported within the basin frame 5', wherein the magnetic loop system 7' comprises a permanent magnet 71' and a base 72', as shown in FIG. 8, wherein the permanent magnet 71' of the magnetic loop system 7' is embedded within the base for providing a magnetic field. The magnetic loop system 7' is affixed within the basin frame 5' so as to completely form the one piece element of the magnetic vibration provider.

The magnetic vibration provider further comprises two terminal sheets 9' provided at a two side of the basin frame 5', wherein another end of the conductive wire 8' is extended to operatively connect to the respective terminal sheet 9'. The conductive wire 8' is extended below the vibration sheet 2' within the gasket 4' to electrically connect with the respective terminal sheet 9'.

Accordingly, two connections cables can be coupled with the terminal sheets 9' such that when the connections cables are operatively connected to an external source, the voice coil unit 6' is electrically communicated with the external source for the current passing through the voice coil unit 6'.

Furthermore, the gasket 4' is coupled with the basin frame 5' by ultrasonic to integrally mount the vibration body with the magnetic vibration provider by ultrasonic. Accordingly, the gasket 4' is coupled with the basin frame 5' by ultrasonic connection to prevent the unwanted shift of the vibration sheet 2', and to connect accurately. Therefore, the voice coil unit 6' is electromagnetically communicated with the magnetic loop system 7' in responsive to the magnetic field thereof to drive the voice coil unit 6' in an axially movable manner so as to generate a vibration force at the vibration sheet 2'.

The vibration sheet 2' can be formed by injecting molding directly, or by embedding the conductive sheets 1' into the vibration sheet 2 via injection. The conductive sheet 1' could be two pieces spacedly aligned to form a round shape or one piece round shape sheet. The material of the conductive sheet 1' could be copper, tinned aluminum, or PCB plate, for the purposes of conducting and adding weight. The conductive sheet 1' is coated with a plastic layer (such as PP) for insulation, and is embedded into the vibration sheet 2'. Then using a special mold, at the time of injecting the suspension edge 3' by the injector, the suspension edge 3' and the vibration sheet 2' are formed integrally. In other words, the conductive sheets 1', the vibration sheet 2', the suspension edge 3', and the gasket 4' are integrally formed in one piece vibration body. Therefore, the vibration body is coupled with the magnetic vibration provider to magnetically communicate the voice coil unit 6' with the permanent magnet 71' of the magnetic loop system 7'.

The two relative conductive sheets 1' are aligned in "S" shape, (Tai Chi or yin-yang shape), in order to prevent the conductive sheets 1' from being tilted in different levels at the planar direction during resonant vibration. The tilted conductive sheets 1' will affect the quality of the vibrator.

The conductive sheets 1' can increase the weight of the vibration sheet 2', adjust the resonance frequency for resonate with the input AC current. It also acts as the conductive media for the voice coil wire of the voice coil 6' for the current input.

It is appreciated that the vibration sheet 2' and the suspension edge 3' are integrally formed as one piece by the injection molding method, the connection of the vibration sheet 2' and the voice coil unit 6' can be connected without the glue, and the ultrasonic connection method is adapted for the connection of the vibration body and the magnetic vibration provider. Thus, the electromagnetic vibrator of the present invention simplifies the complicated conventional process which involves lots of glue for connecting each of two elements of the electromagnetic vibrator. Using the glue for the connecting purpose is not only inaccurate, but also hard to maintain the consistency of quality since the glue intends to peel off as the time passed by.

Referring to FIG. 8 of the drawings, a first alternative of the second embodiment of the present invention is illustrated, wherein the gasket 4' comprises a plurality of protrusions 41A, and a basin frame 5' comprises a plurality of slots 51A, having a size and shape geographically matching the protrusions 41A of the gasket 4'. The gasket 4' is slidably engaged with the basin frame 5' by slidably inserting the protrusions 42B into the slots 52B to securely couple the vibration body with the magnetic vibration provider. Use a thermal fixing method to securely affix the protrusions 41A of the gasket 4' at the slots 51A of the basin frame 5'.

Figure 9:
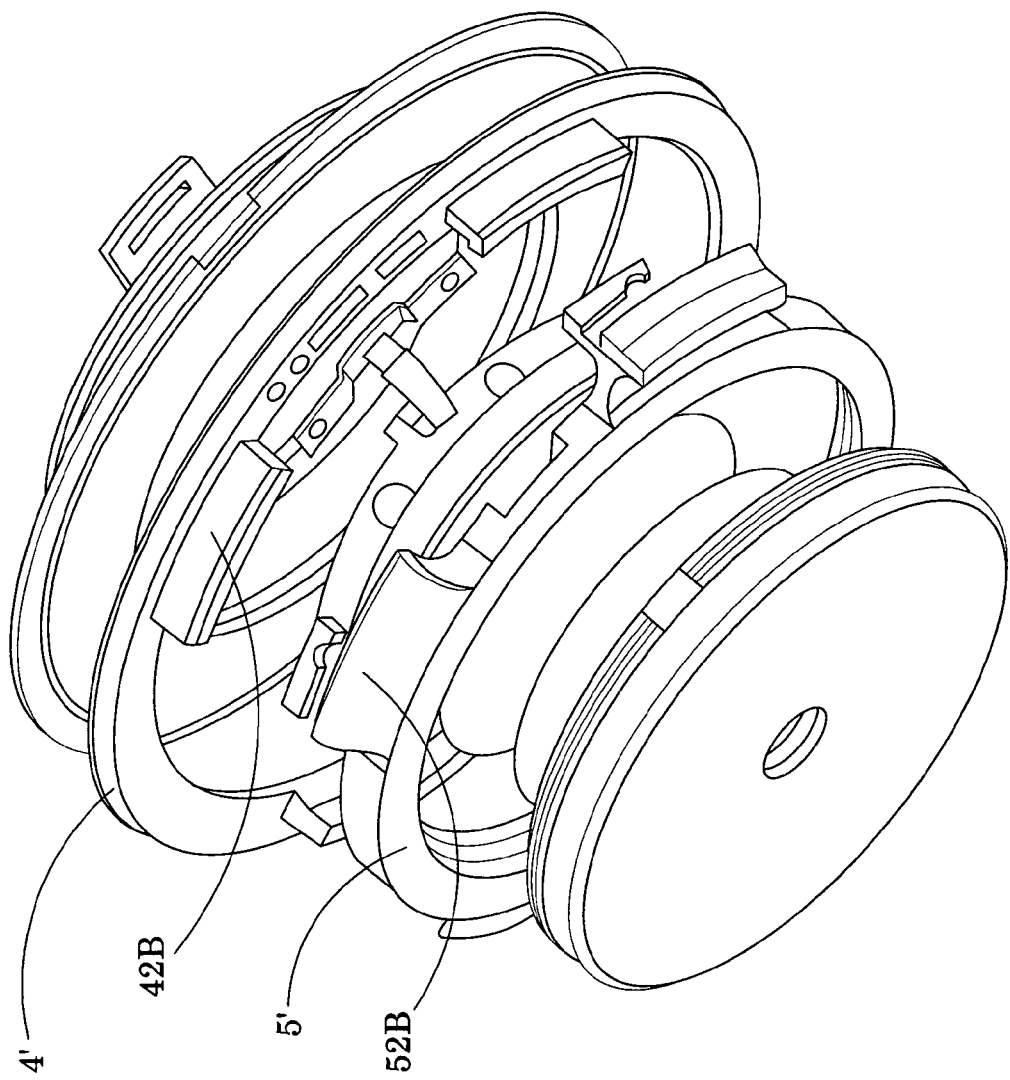
FIG. 9 is an exploded perspective view of the electromagnetic vibrator according to a second alternative of the second embodiment of the present invention.

Referring to FIG. 9 of the drawings, a second alternative of the second embodiment of the present invention is illustrated, wherein the magnetic vibration provider comprises a plurality of protrusions 42B, while the basin frame 5' comprises a plurality of slots 52B having a size and shape geographically matching the protrusions 42B of the gasket 4'. The gasket 4' is rotatably engaged with the basin frame 5' by the engagement between the protrusions 42B and the slots 52B to couple the vibration body with the magnetic vibration provider.

Figure 10:
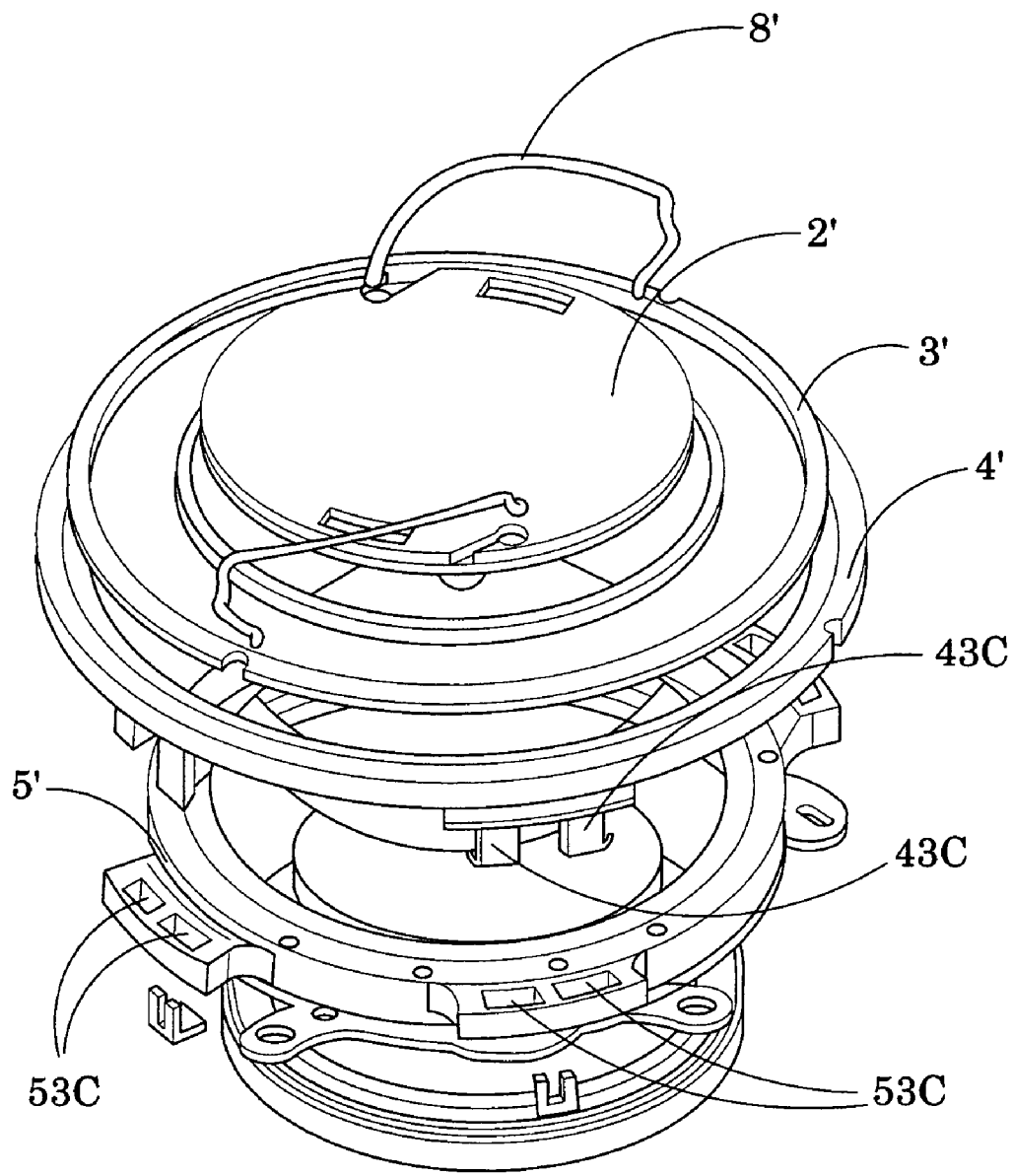
FIG. 10 is an exploded perspective view of the electromagnetic vibrator according to a third alternative of the second embodiment of the present invention.

Referring to FIG. 10 of the drawings, a third alternative of the second embodiment of the present invention is illustrated, wherein the magnetic vibration provider comprises a plurality of engaging clippers 43C, wherein the basin frame 5' comprises a plurality of engaging slots 53C having a size and shape geographically matching the engaging clippers 43C of the gasket 4'. The gasket 4' is securely engaged with the basin frame 5' by the clipping engagement between the engaging clippers 43C and the engaging slots 53C to couple the vibration body with the magnetic vibration provider.

In addition, the conductive wire 8' is extended through the vibration sheet 2' at a position above the flat surface thereof and is returned back through the gasket 4' so as to electrically connect with the respective terminal sheet 9'.

Figure 11:
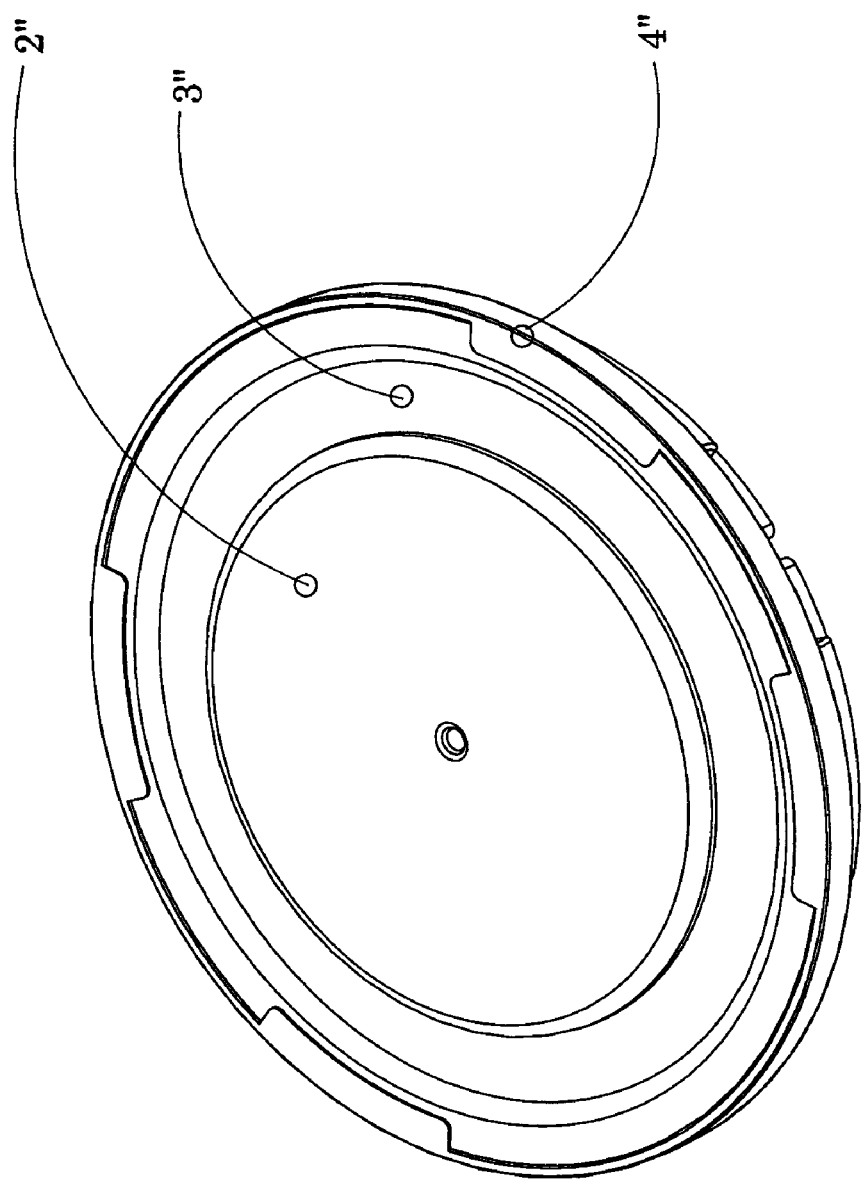
FIG. 11 is a perspective view of the electromagnetic vibrator according to a third embodiment of the present invention.
Figure 12:
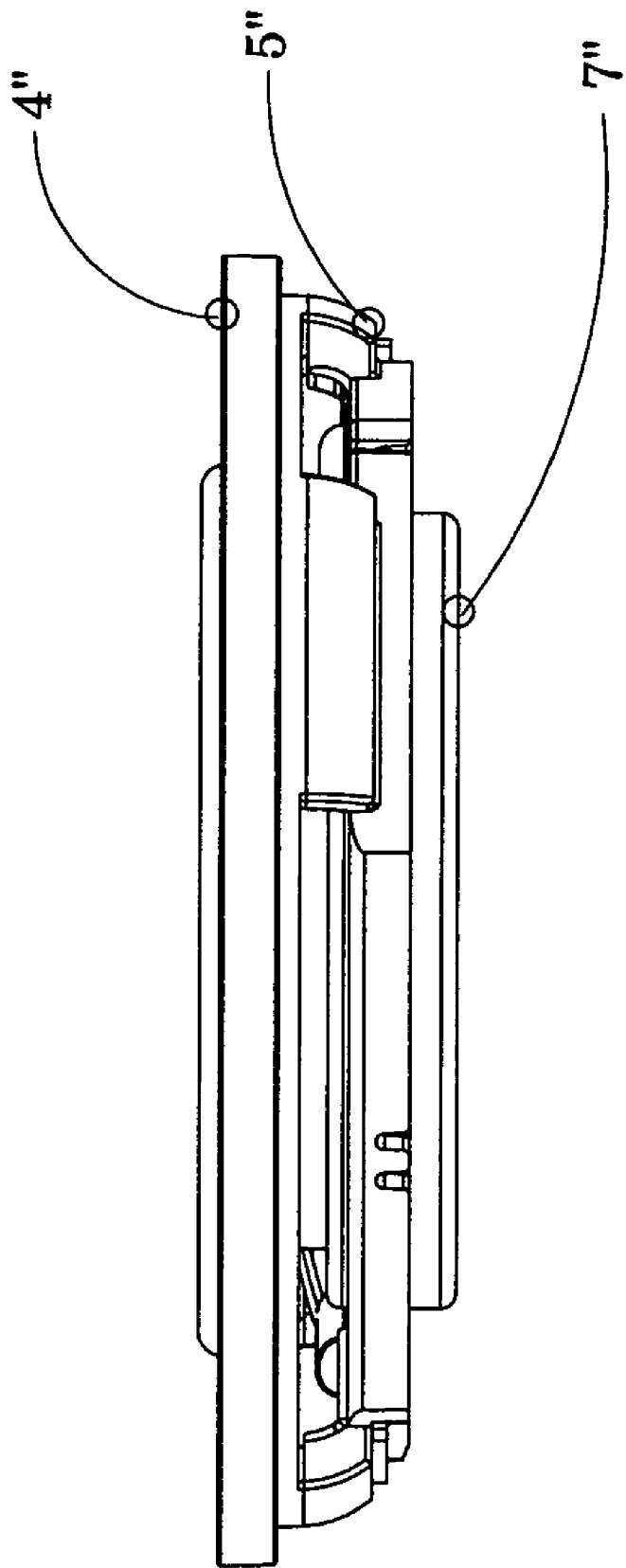
FIG. 12 is a partially sectional view of the electromagnetic vibrator according to the third embodiment of the present invention.
Figure 13:
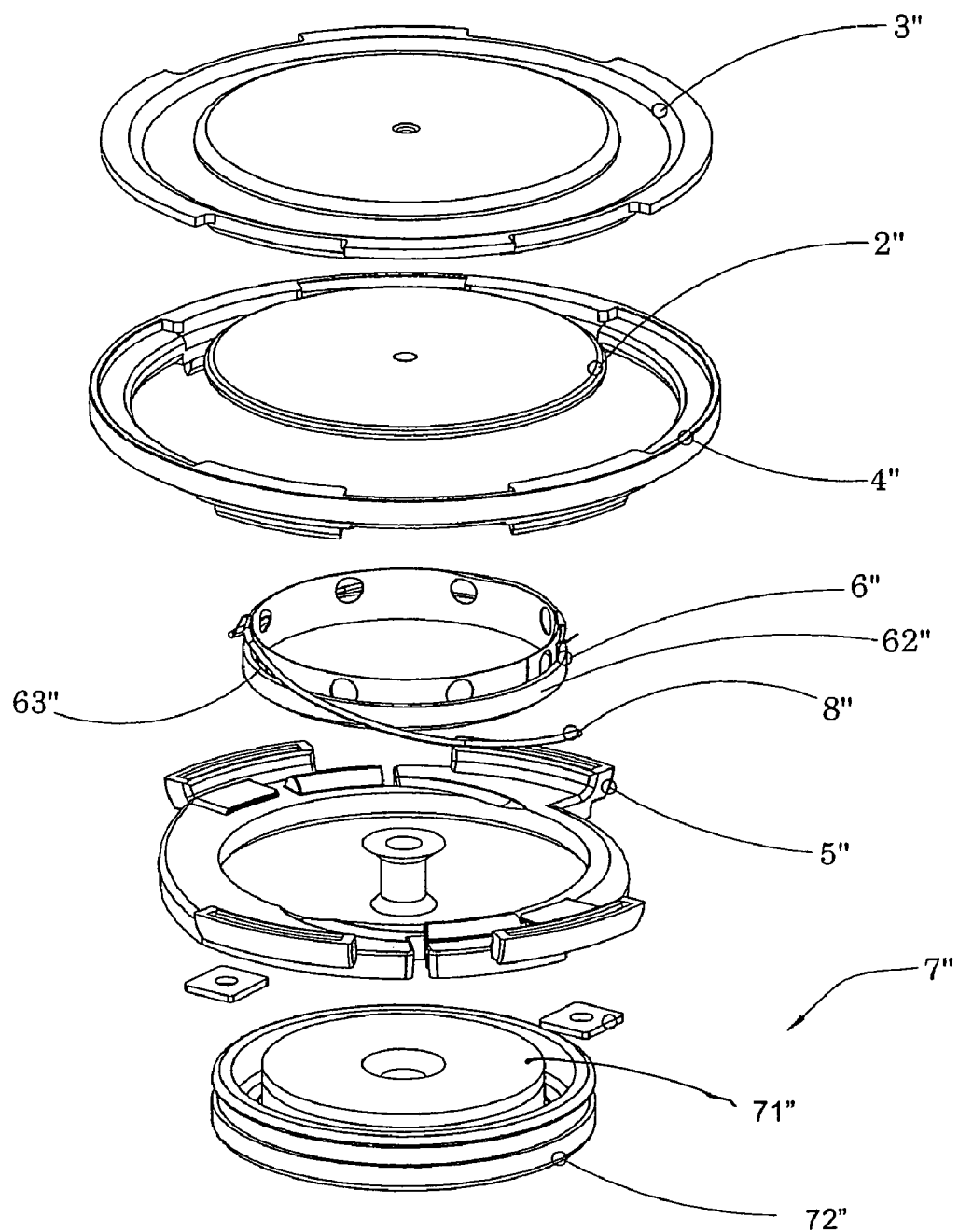
FIG. 13 is an exploded perspective view of the electromagnetic vibrator according to the third embodiment of the present invention.

Referring to FIGS. 11, 12, and 13 of the drawings, an electromagnetic vibrator according to a third embodiment of the present invention is illustrated, wherein the electromagnetic vibrator comprises a vibration body and a magnetic vibration provider 200A. The vibration body comprises a vibration sheet 2", a suspension edge 3", and a voice coil ring 6", wherein the vibration sheet 2" comprises two conductive sheets 1" sealed therewithin to form a flat surface of the vibration sheet 2". The two conductive sheets 1" are spaced apart from each other and are aligned to form a round shape, so that the conductive sheets 1" can be used as a cathode and anode.

The suspension edge 3" has a center portion and an edge portion, wherein the vibration sheet 2" is embedded at the inner side of the center portion of the suspension edge 3" by mold injection. Accordingly, the vibration sheet 2" has a flat surface integrally overlapped with the center portion of the suspension edge 3". In other words, the center portion of the suspension edge 3" also has a flat surface corresponding to the flat surface of the vibration sheet 2". It is appreciated that the flat surface of the vibration sheet 2" embedding the conductive sheet 1" not only can be easily formed by the injection molding, but also can minimize the size of the electromagnetic vibrator of the present invention, i.e. the thickness of the electromagnetic vibrator.

It is appreciated that the flat surface of the vibration sheet 2" embedding the conductive sheet 1" not only can be easily formed by the injection molding, but also can minimize the size of the electromagnetic vibrator of the present invention.

The voice coil unit 6" is affixed at the back of the vibration sheet 2" by glue, wherein the voice coil unit 6" comprises a voice coil 62" and a voice coil wire 63" operatively extended from the voice coil 62".

The vibration body further comprises a conductive wire 8" extended from the voice coil wire 63" to operatively extend from the voice coil unit 6".

The vibration sheet 2" is integrally connected with the suspension edge 3" by an injection molding, so that the vibration sheet 2", the two conductive sheets 1", the voice coil unit 6", and the suspension edge 3" are integrally formed one piece element.

The vibration body further comprises a gasket 4" integrally coupling with the edge portion of the suspension edge 3", wherein the gasket 4" is arranged to couple with the magnetic vibration provider. Accordingly, the suspension edge 3" is coupled with the gasket 4" by an injection molding method to integrally affix the edge portion of the suspension edge 3" to the gasket 4".

The magnetic vibration provider comprises a basin frame 5", two terminal sheets 9" provided at two side of the basin frame 5" respectively, and a magnetic loop system 7", wherein the magnetic loop system 7" comprises a permanent magnet 71" and a base 72", as shown in FIG. 13, wherein the permanent magnet 71" of the magnetic loop system 7" is embedded within the base 72" for providing a magnetic field. The magnetic loop system 7" is affixed within the basin frame 5" so as to completely form the one piece element of the magnetic vibration provider, so as to couple the voice coil unit 6" with the permanent magnet 71" of the magnetic loop system 7" to provide the electromagnetic field.

Furthermore, the gasket 4" is coupled with the basin frame 5" by ultrasonic to integrally mount the vibration body with the magnetic vibration provider by ultrasonic. Accordingly, the gasket 4' is coupled with the basin frame 5" by ultrasonic connection to prevent the unwanted shift of the vibration sheet 2", and to connect accurately. Therefore, the voice coil unit 6" is electromagnetically communicated with the magnetic loop system 7" in responsive to the magnetic field thereof to drive the voice coil unit 6" in an axially movable manner so as to generate a vibration force at the vibration sheet 2".

The vibration sheet 2" can be formed by injecting molding directly, or by embedding the conductive sheets 1" into the vibration sheet 2" via injection. The conductive sheet 1" could be two pieces spacedly aligned to form a round shape or one piece round shape sheet. The material of the conductive sheet 1" could be copper, tinned aluminum, or PCB plate, for the purposes of conducting and adding weight. The conductive sheet 1" is coated with a plastic layer (such as PP) for insulation, and is embedded into the vibration sheet 2". Then using a special mold, at the time of injecting the suspension edge 3" by the injector, the suspension edge 3" and the vibration sheet 2" are formed integrally. In other words, the conductive sheets 1", the vibration sheet 2", the suspension edge 3", and the gasket 4" are integrally formed in one piece vibration body. Therefore, the vibration body is coupled with the magnetic vibration provider to magnetically communicate the voice coil ring 6" with the permanent magnet 71" of the magnetic loop system 7".

The two relative conductive sheets 1" are aligned in "S" shape, (Tai Chi or yin-yang shape), in order to prevent the conductive sheets 1" from being tilted in different levels at the planar direction during resonant vibration. The tilted conductive sheets 1" will affect the quality of the vibrator.

The conductive sheets 1" can increase the weight of the vibration sheet 2", adjust the resonance frequency for resonate with the input AC current. It also acts as the conductive media for the voice coil wire 63" of the voice coil 6" for the current input.

It is appreciated that the vibration sheet 2" and the suspension edge 3" are integrally formed as one piece by the injection molding method, and the ultrasonic connection method is adapted for the connection of the vibration body and the magnetic vibration provider. Thus, the electromagnetic vibrator of the present invention simplifies the complicated conventional process which involves lots of glue for connecting each of two elements of the electromagnetic vibrator. Using the glue for the connecting purpose is not only inaccurate, but also hard to maintain the consistency of quality since the glue intends to peel off as the time passed by.

A method to fabricate the electromagnetic vibrator accordingly to the second embodiment of the present invention comprises the following steps.

(1) Form a one piece vibration body by the following steps.

(1.1) Injection molding a vibration sheet 2".

(1.2) Embed the conductive sheets 1" into the vibration sheet 2" by injection.

(1.3) Integrate the vibration sheet 2" with the suspension edge 3" by injection molding.

(1.4) Integrate the gasket 4" with the suspension edge 3" by injection molding.

(1.5) Connect the back of the vibration sheet 2" with the voice coil unit 6", wherein the voice coil 62" is winded around for a current passing therethrough, and the voice coil wire 63" is extended from the voice coil 62".

(2) From a one piece magnetic vibration provider by the following steps.

(2.1) Integrally embed a permanent magnet 71" in a base to form the magnetic loop system 7".

(2.2) Affix two terminal sheets 9" at the peripheral of the basin frame 5".

(2.3) Affix the base with the permanent magnet 71" of the magnetic loop system 7" into the basin frame 5" of the magnetic vibration provider to form one piece of the magnetic vibration provider.

(3) Affixing the vibration body with the magnetic vibration provider to electromagnetically communicate the voice coil unit 6" with the magnetic field generated by the permanent magnet 71".

Accordingly, in the step (3), the gasket 4" is coupled with the basin frame 5" by ultrasonic connection to integrally couple the vibration body with the magnetic vibration provider. Likewise, the gasket 4" can be coupled with the basin frame 5" by the above mentioned connection methods, such as sliding insertion, rotating engagement, or clipping engagement.

Once the vibration body is coupled with the magnetic vibration provider, the corresponding end of the conductive wire 8" is electrically coupled with the respective terminal sheet 9".

In the step (1.5), the voice coil unit 6" is connected with the vibration sheet 2" by glue, wherein the conductive wire 8" goes underneath the vibration sheet 2" within the gasket 4" to connect with the terminal sheet 9" at the basin frame 5".

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An electromagnetic vibrator, comprising:
   a magnetic vibration provider which comprises a base, a magnetic element integrally embedded in said base for generating a magnetic field, and a basin frame supporting said base therewithin; and
   a vibration body, which is mounted to said magnetic vibration provider, comprising:
   a suspension edge;
   a vibration sheet embedding with said suspension edge;
   a gasket integrally coupling with a periphery of said suspension edge, wherein said gasket is securely affixed to said basin frame of said magnetic vibration provider; and
   a voice coil unit affixed to an inner side of said vibration sheet to form said vibration body in a one-piece integrated body, and arranged in such a manner that when said vibration body is mounted to said magnetic vibration provider, said voice coil unit is electromagnetically inducted with said magnetic field of said magnetic vibration provider to drive said voice coil unit move in an axially movable manner so as to generate a vibration force at said vibration sheet.

2. The electromagnetic vibrator, as recited in claim 1, wherein said vibration sheet has a flat surface integrally aligning with said suspension edge.

3. The electromagnetic vibrator, as recited in claim 1, wherein said suspension edge has a ring shape that an inner edge of said suspension edge is integrally coupled with said vibration sheet by mold injection while an outer edge of said suspension edge is integrally coupled with said gasket.

4. The electromagnetic vibrator, as recited in claim 2, wherein said suspension edge has a ring shape that an inner edge of said suspension edge is integrally coupled with said vibration sheet by mold injection while an outer edge of said suspension edge is integrally coupled with said gasket.

5. The electromagnetic vibrator, as recited in claim 1, wherein said suspension edge has a center portion and an edge portion, wherein said suspension edge is mold-injected to said vibration sheet to integrally embed said vibration sheet with said center portion of said suspension edge.

6. The electromagnetic vibrator, as recited in claim 2, wherein said suspension edge has a center portion and an edge portion, wherein said suspension edge is mold-injected to said vibration sheet to integrally embed said vibration sheet with said center portion of said suspension edge.

7. The electromagnetic vibrator, as recited in claim 1, wherein said vibration sheet has a plurality of through engaging slots spacedly formed thereat, wherein said voice coil unit has a plurality of protrusions protruded therefrom to slidably penetrating through said engaging slots respectively, wherein each of said protrusions is made of bendable material such that after said protrusion is extended through said respective engaging slot, said protrusion is bent to securely couple said voice coil unit with said vibration sheet.

8. The electromagnetic vibrator, as recited in claim 4, wherein said vibration sheet has a plurality of through engaging slots spacedly formed thereat, wherein said voice coil unit has a plurality of protrusions protruded therefrom to slidably penetrating through said engaging slots respectively, wherein each of said protrusions is made of bendable material such that after said protrusion is extended through said respective engaging slot, said protrusion is bent to securely couple said voice coil unit with said vibration sheet.

9. The electromagnetic vibrator, as recited in claim 6, wherein said vibration sheet has a plurality of through engaging slots spacedly formed thereat, wherein said voice coil unit has a plurality of protrusions protruded therefrom to slidably penetrating through said engaging slots respectively, wherein each of said protrusions is made of bendable material such that after said protrusion is extended through said respective engaging slot, said protrusion is bent to securely couple said voice coil unit with said vibration sheet.

10. The electromagnetic vibrator, as recited in claim 1, wherein said gasket is coupled with said basin frame by ultrasonic to integrally mount said vibration body with said magnetic vibration provider.

11. The electromagnetic vibrator, as recited in claim 4, wherein said gasket is coupled with said basin frame by ultrasonic to integrally mount said vibration body with said magnetic vibration provider.

12. The electromagnetic vibrator, as recited in claim 6, wherein said gasket is coupled with said basin frame by ultrasonic to integrally mount said vibration body with said magnetic vibration provider.

13. The electromagnetic vibrator, as recited in claim 4, wherein said gasket comprises a plurality of protrusions, wherein said basin frame comprises a plurality of slots, having a size and shape geographically matching said protrusions of said gasket, wherein said gasket is slidably engaged with said basin frame by slidably inserting said protrusions into said slots to securely couple said vibration body with said magnetic vibration provider.

14. The electromagnetic vibrator, as recited in claim 6, wherein said gasket comprises a plurality of protrusions, wherein said basin frame comprises a plurality of slots, having a size and shape geographically matching said protrusions of said gasket, wherein said gasket is slidably engaged with said basin frame by slidably inserting said protrusions into said slots to securely couple said vibration body with said magnetic vibration provider.

15. The electromagnetic vibrator, as recited in claim 4, wherein said gasket comprises a plurality of protrusions, wherein said basin frame comprises a plurality of slots having a size and shape geographically matching said protrusions of said gasket, wherein said gasket is rotatably engaged with said basin frame by rotatably engaging said protrusions with said slots to securely couple said vibration body with said magnetic vibration provider.

16. The electromagnetic vibrator, as recited in claim 6, wherein said gasket comprises a plurality of protrusions, wherein said basin frame comprises a plurality of slots having a size and shape geographically matching said protrusions of said gasket, wherein said gasket is rotatably engaged with said basin frame by rotatably engaging said protrusions with said slots to securely couple said vibration body with said magnetic vibration provider.

17. The electromagnetic vibrator, as recited in claim 4, wherein said gasket comprises a plurality of engaging clippers, wherein said basin frame comprises a plurality of engaging slots having a size and shape geographically matching said engaging clippers of said gasket, wherein said gasket is securely engaged with said basin frame by the clipping said engaging clippers with said engaging slots to securely couple said vibration body with said magnetic vibration provider.

18. The electromagnetic vibrator, as recited in claim 6, wherein said gasket comprises a plurality of engaging clippers, wherein said basin frame comprises a plurality of engaging slots having a size and shape geographically matching said engaging clippers of said gasket, wherein said gasket is securely engaged with said basin frame by the clipping said engaging clippers with said engaging slots to securely couple said vibration body with said magnetic vibration provider.

19. A method of manufacturing an electromagnetic vibrator, comprising the steps of:
 (a) forming a one piece vibration body by the steps of:
  (a.1) injection molding a vibration sheet with a suspension edge;
  (a.2) integrally affixing said suspension edge with a gasket; and
  (a.3) affixing a voice coil unit at a back of said vibration body;
 (b) forming a one piece magnetic vibration provider by the steps of:
  (b.1) integrally embedding a permanent magnet in a base to form a magnetic loop system for generating a magnetic field; and
  (b.2) affixing said base with said permanent magnet of said magnetic loop system to a basin frame; and
 (c) affixing said gasket to said basin frame to couple said vibration body with said magnetic vibration provider so as to electromagnetically communicate said voice coil unit with said magnetic field generated by said permanent magnet.

20. The method, as recited in claim 19, wherein said vibration sheet has a flat surface integrally aligning with said suspension edge.

21. The method, as recited in claim 20, wherein said suspension edge has a ring shape that an inner edge of said suspension edge is integrally coupled with said vibration sheet by mold injection while an outer edge of said suspension edge is integrally coupled with said gasket.

22. The method, as recited in claim 20, wherein said suspension edge has a center portion and an edge portion, wherein said suspension edge is mold-injected to said vibration sheet to integrally embed said vibration sheet with said center portion of said suspension edge.

23. The method, as recited in claim 21, wherein, in the step (a.3), said vibration sheet has a plurality of through engaging slots spacedly formed thereat, wherein said voice coil unit has a plurality of protrusions protruded therefrom to slidably penetrating through said engaging slots respectively, wherein each of said protrusions is made of bendable material such that after said protrusion is extended through said respective engaging slot, said protrusion is bent to securely couple said voice coil unit with said vibration sheet.

24. The method, as recited in claim 22, wherein, in the step (a.3), said vibration sheet has a plurality of through engaging slots spacedly formed thereat, wherein said voice coil unit has a plurality of protrusions protruded therefrom to slidably penetrating through said engaging slots respectively, wherein each of said protrusions is made of bendable material such that after said protrusion is extended through said respective engaging slot, said protrusion is bent to securely couple said voice coil unit with said vibration sheet.

25. The method as recited in claim 21 wherein, in the step (c), said gasket is coupled with said basin frame by ultrasonic to integrally mount said vibration body with said magnetic vibration provider.

26. The method as recited in claim 22 wherein, in the step (c), said gasket is coupled with said basin frame by ultrasonic to integrally mount said vibration body with said magnetic vibration provider.

27. The method as recited in claim 21 wherein, in the step (c), said gasket is slidably engaged with said basin frame to mount said vibration body with said magnetic vibration provider.

28. The method as recited in claim 22 wherein, in the step (c), said gasket is slidably engaged with said basin frame to mount said vibration body with said magnetic vibration provider.

29. The method as recited in claim 21 wherein, in the step (c), said gasket is rotatably engaged with said basin frame to mount said vibration body with said magnetic vibration provider.

30. The method as recited in claim 22 wherein, in the step (c), said gasket is rotatably engaged with said basin frame to mount said vibration body with said magnetic vibration provider.

31. The method as recited in claim 21 wherein, in the step (c), said gasket is clipped on said basin frame to mount said vibration body with said magnetic vibration provider.

32. The method as recited in claim 22 wherein, in the step (c), said gasket is clipped on said basin frame to mount said vibration body with said magnetic vibration provider.

* * * * *